United States Patent Office 3,600,196
Patented Aug. 17, 1971

3,600,196
NOVEL CREAM PRODUCTS AND THEIR PREPARATION
Christian Heine, Monheim, Rhineland, and Clemens von Schilcher, Leverkusen, Germany, assignors to Henkel & Cie G.m.b.H., Dusseldorf, Germany
No Drawing. Continuation of application Ser. No. 552,402, May 24, 1966. This application Nov. 18, 1969, Ser. No. 871,680
Claims priority, application Germany, July 16, 1965, H 56,608
Int. Cl. A23g 3/00
U.S. Cl. 99—134A
13 Claims

ABSTRACT OF THE DISCLOSURE

Cream products comprising 50 to 70% of shortening having a solids content of 10 to 15% at 20° C. and 5 to 10% at 30° C. and 20 to 30% of sugar and optional up to 30% of other powdered ingredients and having 20 to 150 cc. of an inert gas dispersed there through per 100 grams of product.

PRIOR ART

This application is a continuation of Ser. No. 552,402 filed May 24, 1966 now abandoned.

Cream products such as butter cream, chocolate cream, vanilla cream, hazelnut cream, etc. are frequently used in bakeries as well as the home. The most common recipes usually contain water which is blended either with the shortening and/or is introduced by the addition of milk or raw eggs, and the presence of the water causes these creams to have a poor stability and they cannot be stored for prolonged periods.

OBJECTS OF THE INVENTION

It is an object of the invention to provide novel cream products of lasting stability which can be packaged in tubes or other containers for prolonged storage.

It is another object of the invention to provide a novel process for the preparation of cream products of prolonged stability.

These and other objects and advantages of the invention will become obvious from the following detailed description.

THE INVENTION

The cream products of the invention are comprised of 50 to 70% of shortening having a solids content of 10 to 15% at 20° C. and 5 to 8% at 30° C. (determined by expansion measurement), 20 to 30% of sugar, 0 to 30% of other powdery ingredients and 20 to 150 ml. of an inert gas per 100 gm. of product and any desired flavoring agent. The said products are substantially anhydrous since they were prepared without the addition of water or other ingredients containing substantial amounts of water such as milk and raw eggs. The products can be packaged in tubes or other containers and be stored for prolonged periods. The products have a most homogenous consistency over the temperature range of ordinary use, usually 10 to 30° C. and the said consistency should not vary during storage. At low temperatures, the cream products can be pressed out of a tube and spread without any difficulty and at elevated temperatures of use, the cream products do not become disintegrated or melt.

The shortening used in the cream products of the invention may be esterified or hardened shortenings or natural fats which have not been chemically changed but merely refined by the usual processes. A mixture of natural vegetable fats is preferred. A particularly suitable starting material is mixtures of palm oil and cottonseed oil in weight ratios of 70:30 to 50:50, with the optimum usually being 60:40 depending upon the amount and nature of the other ingredients. Other suitable mixtures are mixtures of palm oil and soybean oil in a weight ratio of approximately 60:40 and mixtures of palm oil and peanut oil in a weight ratio of approximately 70:30. The shortening should not contain any fats of the coconut group such as coconut oil or palm kernel oil since they melt over a narrow temperature range and effect a relatively pronounced lowering of the melting point when mixed with other shortenings.

The total amount of shortening in the cream product is usually 50 to 70% by weight, preferably 55 to 65% by weight.

The sugar used in the compositions is preferably the commercial form of powdered sugar although any dry form of sugar may be used. The other powdery ingredients may be powdered milk, powdered egg, powdered chocolate, finely chopped nuts, powdered coffee, etc. Depending on the requirements of the cream product, aromatic and flavoring substances may also be added. Some of these powdery ingredients such as chocolate and nougat contain fats and preferably the total shortening content of the cream product should not exceed 70%, and more preferably 65%.

The amount of inert gas in the cream product is 20 to 150 ml., preferably 40 to 100 ml. (measured at 20° C.) per 100 gm. of the total mixture. Mixtures with a gas content higher than 100 ml. per 100 gm. contain approximately the same amount of shortening per mole unit as a butter cream prepared in known ways. Examples of inert gas are nitrogen, carbon dioxide, etc.

The preparation of the cream product is advantageously done by melting the shortening preferably at temperatures between 60 and 90° C., stirring in the powdered sugar and other powdery ingredients, and then incorporating the desired amount of the inert gas into the mixture. With small batches, the gas is incorporated into the liquid mixture with stirring and simultaneous cooling of the mixture to about 15° C. For the small batches, solid carbon dioxide, so-called Dry Ice, is added to the melted mixture with strong stirring which simultaneously cools the mixture. For large batches, the inert gas is advantageously added to the heated mixture in a votator under rapid cooling.

The finished cream product will change its consistency during a specific period of time. To control the crystallization process occurring thereby and to prevent the formation of any faulty batches, it is advantageous to temper the product at a temperature of about 30° C., usually for a period of 24–48 hours. The cream products treated in this manner do not exhibit any substantial change in their consistency even after prolonged storage. Also, said products will retain their elasticity at refrigeration temperature as well as at temperature up to about 30° C., which means they are always ready for use. They are stable for prolonged periods of time and, therefore, prove to be definitely superior to creams which have been prepared with a butter or margarine base.

In the following examples there are described several preferred embodiments to illustrate the invention. However, it should be understood that the invention is not intended to be limited to the specific embodiments.

EXAMPLE I

Preparation of vanilla creams 625 gm. of a 60:40 by weight mixture of palm oil and cottonseed oil having a solids content of 11.2% at 20° C. and a solids content of 6.2% at 30° C. (determined by the expansion method) were melted and first 260 gm.

of powdered sugar were stirred into the melted shortening followed by the addition of 85 gm. of skim milk powder, 10 gm. of powdered egg yolk and 20 gm. of vanilla sugar with stirring. The total stirring time was 3 minutes. The mixture was then heated to 75° C. after which 250 gm. of crushed Dry Ice were added slowly with rapid stirring to cool the mixture to 16° C. Stirring was continued until the mixture returned to room temperature (about 23° C.) so that the mixture contained about 75 ml. of inert carbon dioxide per 100 gm. of the mixture. Then, the mixture was tempered at 30° C. for 48 hours after which it was placed in tubes. The said product retained its cream-like consistency even after prolonged storage periods.

Another vanilla cream having good stability was prepared by the same procedure using a 70:30 by weight mixture of palm oil and cottonseed oil having 14.8% solids at 20° C. and 7.5% solids at 30° C. Another excellent vanilla cream was prepared by the same procedure using a 60:40 by weight mixture of palm oil and soybean oil having a solids content of 11.5% at 20° C. and a solids content of 6.0% at 30° C. Using the same procedure, a 65:35 by weight mixture of palm oil and peanut oil having a solids content of 13.0% at 20° C. and a solids content of 6.0% at 30° C. was used to prepare a vanilla cream having excellent taste and stability for prolonged storage.

EXAMPLE II

Preparation of chocolate cream

Using the procedure of Example I, a chocolate cream was prepared from 525 gm. of a 60:40 by weight mixture of palm oil and cottonseed oil having a solids content of 11.2% at 20° C. and 6.2% at 30° C., 230 gm. of powdered sugar, 70 gm. of powdered milk, 120 gm. of bitter chocolate and 25 gm. of cocoa and the final cream product contained 73 ml. of carbon dioxide per 100 gm. of product. The savory cream could be pressed out of the tube without difficulty even after prolonged storage and there was no noticeable change in the consistency of the cream at temperatures from 10 to 30° C.

EXAMPLE III

Preparation of hazelnut cream

Using the procedure of Example I, a hazelnut cream was prepared from 565 gm. of a 60:40 by weight mixture of palm oil and cottonseed oil having a solids content of 11.2% at 20° C. and 6.2% at 30° C., 235 gm. of powdered sugar, 75 gm. of powdered milk, 125 gm. of finely ground hazelnuts and 15 drops of a 10% alcoholic solution of commercial hazelnut flavoring. The said cream had excellent stability.

Various modifications of the products and process of the invention may be made without departing from the spirit or scope thereof and it is to be understood that the invention is to be limited only as defined in the appended claims.

What is claimed is:

1. An essentially anhydrous cream product comprised of 50 to 70% of shortening having a solids content of 10 to 15% at 20° C. and 5 to 8% at 30° C. determined by expansion measurement, 20 to 30% of sugar, 0 to 30% of other powdered ingredients and flavorings and 20 to 150 ml. measured at 20° C. of an inert gas uniformly dispersed at atmospheric pressure throughout said cream product per 100 gm. of the total mixture.

2. The composition of claim 1 wherein the shortening is a mixture of palm oil and cottonseed oil with a weight ratio of 70:30 to 50:50.

3. The composition of claim 2 wherein the weight ratio is about 60:40.

4. The composition of claim 1 wherein the shortening is about a 60:40 by weight mixture of palm oil and soybean oil.

5. The composition of claim 1 wherein the shortening is about a 70:30 by weight mixture of palm oil and peanut oil.

6. The composition of claim 1 containing 40 to 100 ml. of inert gas per 100 gm. of the total mixture.

7. The composition of claim 1 which has been tempered at about 30° C.

8. A process for the preparation of a cream product comprised of 50 to 70% of shortening having a solids content of 10 to 15% at 20° C. and 5 to 8% at 30° C. determined by expansion measurement, 20 to 30% of sugar, 0 to 30% of other powdered ingredients and flavorings which comprises heating the shortening to liquefy it, stirring the sugar and the other powdered ingredients into the liquefied shortening, uniformly dispersing throughout the resulting mixture at atmospheric pressure 20 to 150 ml. of an inert gas per 100 gm. of mixture while rapidly cooling the mixture to about 15° C. to form the said cream product, and tempering said cooled cream product for the purpose of preserving consistency thereof.

9. The process of claim 8 wherein the cooled cream product is tempered at about 30° C. for about 24 to 48 hours.

10. The process of claim 8 in which the inert gas is carbon dioxide which is added by stirring solid carbon dioxide into the liquid shortening mixture.

11. The process of claim 8 wherein the shortening is a mixture of palm oil and cottonseed oil with a weight ratio of 70:30 to 50:50.

12. The process of claim 8 wherein the shortening is about 60:40 by weight mixture of palm oil and soybean oil.

13. The process of claim 8 wherein the shortening is about a 70:30 by weight mixture of palm oil and peanut oil.

References Cited

UNITED STATES PATENTS 2,645,580   7/1953   Schultz _____ 99—134

A. LOUIS MONACELL, Primary Examiner

J. M. HUNTER, Assistant Examiner

U.S. Cl. X.R.

99—139